July 14, 1931.  W. A. CHRYST  1,814,243
ELECTRIC MOTOR
Filed July 3, 1928
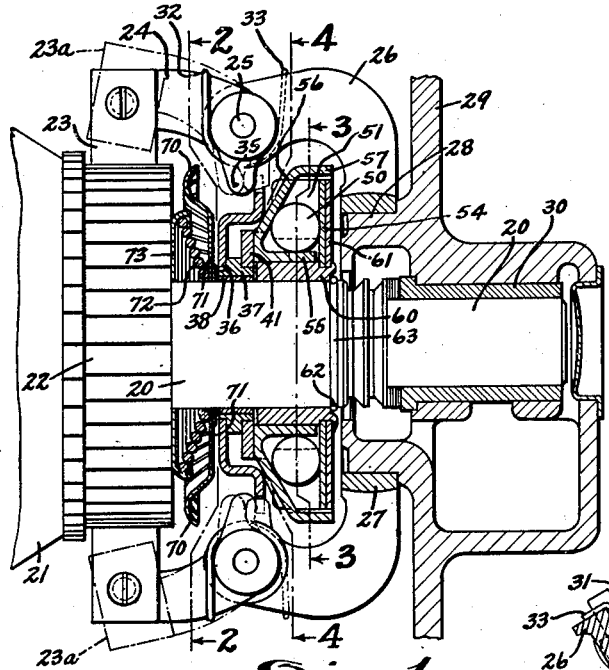
Inventor
William A. Chryst
By Spencer Hardman & Fehr
his Attorneys Patented July 14, 1931

1,814,243

UNITED STATES PATENT OFFICE

WILLIAM A. CHRYST, OF DAYTON, OHIO, ASSIGNOR, BY MESNE ASSIGNMENTS, TO DELCO PRODUCTS CORPORATION, OF DAYTON, OHIO, A CORPORATION OF DELAWARE

ELECTRIC MOTOR

Application filed July 3, 1928. Serial No. 290,144.

This invention relates to centrifugal switches and more particularly to switches for short-circuiting the segments of the commutator of a repulsion induction motor, and also to speed responsive devices for lifting the brushes from the motor commutator after a certain speed has been attained.

One object of the present invention is to provide a speed responsive commutator short-circuiting switch and brush lifting mechanism simple and durable in construction and which can be manufactured at a relatively low cost.

Further objects and advantages of the present invention will be apparent from the following description, reference being had to the accompanying drawings, wherein a preferred form of embodiment of the present invention is clearly shown.

In the drawings

Fig. 1 is a fragmentary side view partly in section of a speed responsive commutator short-circuiting switch and brush-lifting mechanism embodying the present invention.

Figs. 2, 3 and 4 are sectional views taken respectively on the lines 2—2, 3—3 and 4—4 of Fig. 1.

The electric motor is shown in the drawings as having a shaft 20 supporting an armature 21 and a commutator 22. The commutator is engaged by a plurality of brushes 23 each attached to a brush arm 24 pivoted upon a stud 25 attached to a rigid arm 26 integral with a collar 27 which may be secured to a cylindrical extension 28 of an end frame 29 of the motor which carries a bearing 30 for supporting the shaft 20. A coil spring 31 surrounds the hub of each brush arm 24 and has one end bearing against the arm as indicated at 32 in Fig. 1 and the other end bearing against the fixed arm 26 as indicated by numeral 33 in Figs. 1 and 4. The springs 31 are biased for pressing the brushes 23 against the commutator 22. Each brush arm 24 is provided with a lug 35 located in the path of axial movement of a plate 36 which is slidable along the shaft 20 but does not rotate therewith. The plate 36 is attached to a hub 37 having a self-lubricating bearing lining member 38 journalled upon the shaft 20. The plate 36 is prevented from turning by providing it with notched portions 39 each adapted to receive a lug 40 integral with certain one of the fixed brush supporting arms 26 as shown particularly in Figs. 1 and 4. The hub 37 is attached to a washer 41 of self-lubricating material. The parts 38 and 41 may be formed of porous metallic structure saturated with lubricating oil.

The brush lifting actuating plate 36 is moved endwise toward the left as viewed in Fig. 1 in order to raise the brushes by speed responsive device which comprises a plurality of balls 50 each guided for radial movement relative to the shaft 20 by the walls of the ball receiving pocket 51. Each pocket 51 is defined by a pair of parallel walls 52, 53 integral with a plate 54 shown in Fig. 1, by that portion of the plate 54 located between the walls 52 and 53 and by the cylindrical wall 55 and the conical wall 56 provided by an annular member 57 which is somewhat V-shaped in annular cross section. The wall 56 is provided with pairs of oblong openings 58, 59 respectively receiving the pairs of wall members 52 and 53 of the plate 54. The member 57 is slidable axially upon a hub 60 to which the plate 54 and a reinforcing plate 61 are attached. Axial movement of the hub 60 toward the right as viewed in Fig. 1 is limited by the hub engaging a wire split ring 62 received by a groove 63 in the shaft 20. Therefore as the balls 50 move radially outwardly, the member 57 will be forced toward the left as viewed in Fig. 1 since the balls 50 operate to separate the conical wall 56 from the plane wall 54. Thus the brushes 23 are lifted after a predetermined speed of the shaft 20 is attained.

The centrifugal device which operates the brush lifting mechanism also operates means for short-circuiting the commutator segments. The commutator segments are engaged simultaneously by the resilient fingers 70 of a conducting disk 71 which is slidable axially along the shaft 20. The fingers 70 are normally maintained out of engagement with the ends of the commutator segments by a conical spiral or a bed-spring type coil spring 72 encircling the shaft 20 and located between the disk 71 and a spring retaining disk 73 located adjacent the end of the commutator. It is therefore apparent that when the brush arm actuating plate 36 is moved to the left in order to move the brushes 23 into the positions 23a indicated by dot and dash lines 23a that the plate 36 will force the plate 71 into engagement with the commutator segments. As the speed of the shaft 20 decreases, the spring 72 will be released to move the plate 71 away from the commutator and also to urge the plate 36 toward the right. Thus the spring 72 cooperates with the springs 31 to restore the parts 36 and 57 to normal position.

While the form of embodiment of the present invention as herein disclosed, constitutes a preferred form, it is to be understood that other forms might be adopted, all coming within the scope of the claims which follow.

What is claimed is as follows:

1. An electric motor comprising, in combination, a frame; a rotor having a shaft journalled in said frame and provided with a commutator; brushes for said commutator; means carried by the shaft for short circuiting the commutator; a speed responsive device carried by the shaft adjacent the short circuiting means, said device having a portion movable toward said means in response to increasing speeds of the rotor shaft, and means interposed between the said means and device for lifting the brushes as the short circuiting means is moved into engagement with the commutator.

2. An electric motor comprising, in combination, a frame; a rotor carried by a shaft journalled in the frame, said rotor having a commutator; brushes for said commutator; a contact ring supported by the shaft so as to be movable into engagement with the commutator to short circuit its segments; a centrifugal device carried by the shaft in juxtaposition to the contact ring, said device having a movable wall which is adapted to move the contact ring against the commutator in response to an increased speed of the rotor shaft; and a ring member supported by the shaft between the contact ring and the centrifugal device, movable longitudinally relative to the shaft by said device to lift the brushes from the commutator.

3. An electric motor comprising, in combination, a frame; a rotor having a shaft journalled in said frame and provided with a commutator; a bracket supported by the frame, said bracket having a plurality of arms extending toward the commutator; a brush carrying holder hingedly attached to said arm, each holder having a lug extending toward the rotor shaft; a commutator short circuiting contact carried by the shaft so as to be movable out or normal position into engagement with the commutator; a centrifugal device on the shaft between the bracket and contact, said device having a wall movable toward the contact in response to increasing speeds of the shaft; and a member slidably supported by the shaft between the movable wall of the centrifugal device and the contact, said member having positions engaging the lugs of the respective brush holders for lifting said brushes substantially concomitant with the engagement of the contact with the commutator.

In testimony whereof I hereto affix my signature.

WILLIAM A. CHRYST.